Patented Nov. 16, 1943

2,334,582

UNITED STATES PATENT OFFICE 2,334,582

PLASTICIZER

Chester L. Read, Westfield, N. J., assignor, by mesne assignments, to Jasco, Incorporated, a corporation of Louisiana No Drawing. Application May 2, 1941, Serial No. 391,484

3 Claims. (Cl. 196—13)

The present invention is concerned with the production of an agent which is readily adapted for utilization as a softener or plasticizer for rubber and rubbery materials. In accordance with the present process a desirable rubber compounding agent is produced and segregated from a petroleum oil fraction utilizing a particular sequence and arrangement of solvent treating and distillation stages.

In the processing of rubbery materials, and synthetic polymers, it is desirable to plasticize and soften these substances before the various milling and molding operations. These rubbery materials, such as natural rubber and the various synthetic polymers, are characterized by having a strong tendency, when stretched or deformed, to return to their original form when the stress is released. Due to this characteristic, it is difficult to process these rubbery materials on the mill, and to mold them satisfactorily into shapes which follow accurately the contours of the mold. Various attempts have been made to overcome this difficulty. For example, it has been customary to plasticize rubber and the various synthetic polymers by the addition thereto of many types of substances, such as oils, fats, waxes, and the like, including solvent extracted oils, such as Edeleanu extracts obtained in the treatment of petroleum distillates; solvent extracts of coastal oils, solvent extracts of petroleum oils; tars and the like. These substances, when mixed with the rubbery materials, cause them to flow more easily, and as as result they are easier to process on the mill, and to mold more accurately.

However, many of these substances do not sufficiently plasticize the rubbery materials and often tend to impart undesirable characteristics to the finished product. For example, they reduce its tensile strength and increase its elongation; they tend to bloom to the surface, as well as increase the milling time and require greater milling power. In other instances, the plasticizing substances volatilize at temperatures within the vulcanizing or curing temperature range; and on standing, tend to devulcanize the rubber or polymers.

I have, however, now discovered a process for segregating a substance from petroleum oils, which substance may be economically segregated and which will also function to impart the desired softening and plasticizing properties to rubber and rubbery materials. In accordance with my invention, petroleum oils are treated with a selective solvent under conditions to segregate a relatively small amount of a relatively highly aromatic product. The selective solvent is separated and the highly aromatic oil is distilled over excess caustic in order to produce a distillate of light color and of a desired viscosity. This distillate is especially adapted and desirable for utilization as a plasticizing agent for rubber and rubbery materials.

It is essential that the feed oil comprise a relatively high boiling petroleum oil fraction. A particularly desirable feed oil comprises a fraction segregated from an aromatic type crude, which fraction boils in the general range from about 600° F. to about 1000° F. and higher; has a viscosity index in the range from about 20 to 0, and preferably below; and has a gravity in the range from about 0° to about 30° A. P. I., preferably a gravity in the range from about 10° to about 20° A. P. I.

Although any solvent of the character which has a preferential selectivity for the relatively more aromatic type constitutents as compared to the relatively more paraffinic type constituents of the feed oil may be employed, such as phenol, beta beta' dichlor diethyl ether, furfural, nitrobenzene, and the like, I have found that particularly desirable results are secured when employing a solvent such as monohydroxy phenol.

The amount of solvent used may vary considerably depending upon the solvent employed, the particular feed oil being treated and the concentration of the desired plasticizing agent present therein. However, in general, when utilizing phenol, I prefer to employ a relatively low ratio of solvent to oil as, for example, less than about two volumes of phenol per volume of oil, preferably from about 0.25 to about 0.75 volume of phenol per volume of oil.

The temperature conditions employed are relatively low so as to reduce the solvent power of the particular solvent being employed. For example, when employing phenol in the treatment of oil of the character described, I prefer to use a temperature at the extract end of the extracting system in the range from about 110° F. to about 160° F., preferably in the range from about 120° F. to about 140° F. A particularly desirable operation comprises utilizing from about 0.25 to 0.5 volume of phenol per volume of oil, and to employ in conjunction therewith anti-solvents, preferably water, which is introduced at a plurality of stages. In general, it is desirable to employ from about 10% to about 20% water based upon the volume of solvent used. Although the pressure may be varied considerably, in general, I prefer to employ atmospheric pressure.

A desirable modification of my invention is to separate the initial extract phase from the raffinate phase in the manner described, utilizing a relatively low ratio of solvent per volume of oil, and then to fractionate the oil content of the extract phase by means of anti-solvents to obtain a highly aromatic product. The primary extract may also be stripped of solvent and the oil content re-extracted with an additional quantity of the same or another solvent. Although any number of extraction stages may be employed, in general, I have found that satisfactory results are secured when two solvent extraction stages are utilized. It is also to be understood that a countercurrent tower treating operation may be employed in the respective stages in which the operation is modified so that the ratio of solvent to oil is relatively low, generally in the range from about 0.25 to 0.5 volume of solvent per volume of oil.

The aromatic oil extract after removal of the solvent is mixed with an excess of alkaline reagent over that required to neutralize the acidic components and the mixture subjected to distillation at low pressures. In general, it is desirable to distill the alkaline extract oil at a pressure of less than 100 mm. of mercury, preferably at a pressure below about 40 mm. of mercury. Preferred alkaline reagents are, for example, sodium hydroxide, potassium hydroxide, calcium hydroxide, and the like.

In order to illustrate the invention further, the following example is given which should not be construed as limiting the same in any manner whatsoever.

*Example*

A distillate secured from a Colombian crude, which had an initial boiling point of about 700° F., an A. P. I. gravity of 19°, a Saybolt viscosity of 90 at 210° F., a viscosity index of 9, an 83° F. aniline point, and which contained 20% aromatics by the Waterman analysis, was extracted with 200% of a solvent comprising 80% phenol and 20% water.

The extract yield was about 9.3% and had a gravity of 1.2° A. P. I., a Saybolt viscosity of 728 seconds at 210° F., an aromatic content of 76%, and an aniline point of about −5° F. This extract oil was distilled over excess sodium hydroxide taking 5% cuts. The results were as follows:

| | °A. P. I. gravity | Viscosity Saybolt at 210° F. | Viscosity index | Viscosity gravity constant | Per cent aromatics |
|---|---|---|---|---|---|
| Cut A 5–10% off | 5.3 | 95.5 | −533 | 1.005 | 62 |
| Cut B 55–60% off | 1.4 | 652 | | 1.009 | 74 |
| Cut C 85–90% off | 0.0 | 2,880 | | 1.011 | 81 |

To illustrate as a specific example one embodiment of the present invention, a rubber-like material was selected which is difficult to plasticize. This material known to the trade as Perbunan (an emulsion interpolymer of butadiene and acrylonitrile) was selected and the following results obtained:

A Williams plastometer (Williams, Inc. and Eng. Chem. 16, 362, 1924) was maintained at a constant temperature (80° C.) in an oven. A fifty gram portion of the above-treated Perbunan stock was milled on 6″ x 12″ rolls set 0.008″ apart and maintained at 120° F. by means of circulating water. The time of milling was five minutes. After a rest of 24 hours, 5/8″ diameter cylinders were cut from the sheets and superimposed to form laminated cylinders of 2 cc. (weighed) volume. The samples so prepared were preheated for fifteen minutes at 80° C. and then placed between the parallel plates of a Williams plastometer maintained of 80° C. A five kg. force was allowed to act on the sample for three minutes after which the thickness of the sample in thousandths of an inch was read as plasticity. This figure, called the "flow number," represented the thickness in 1/100 mm. of the pellet formed by three minutes' exposure to the plastometer load of 5,000 grams.

| | Plasticity | Recovery |
|---|---|---|
| Perbunan—no plasticizer | 193 | 130 |
| Perbunan+15% Barretts No. 10 plasticizer | 158 | 65 |
| Perbunan+15% cut A | 166 | 68 |
| Perbunan+15% cut B | 169 | 63 |
| Perbunan+15% cut C | 161 | 51 |

From the above it is apparent that the agent of the present invention is particularly adapted as a plasticizing agent.

From the above results it is evident that the effectiveness of the plasticizer increases as the specific gravity, the viscosity, and the aromatic content increase. In general, my plasticizing agents are characterized by having a boiling point above 700° F. at atmospheric pressure, a viscosity above 100 Saybolt seconds at 210° F., a specific gravity above 1.0, and an aromatic content according to the Waterman analysis of at least 50%. Particularly desirable plasticizing agents are characterized by having an A. P. I. gravity of less than 5, a viscosity Saybolt at 210° F. above 2000, and an aromatic content of at least 75%.

While the examples given above involve the use of 15% of plasticizer in rubber composition, the quantity required to plasticize other rubber materials may vary widely depending upon the materials plasticized. In general, the amount used comprises from about 5% to 35%.

The application of this plasticizer is not limited to the copolymer of butadiene and acrylonitrile but may be extended to copolymers of butadiene and isobutylene prepared at low temperatures, chloroprene polymers and rubber. The term "rubber" is employed in the claims in a generic sense to include caoutchouc, whether natural or synthetic, reclaimed rubber, balata, gutta percha, rubber isomers, and like products whether or not admixed with fillers, pigments, vulcanizing or accelerating agents. This product may also be used in the reclaiming of vulcanized rubber ni which case the plasticizer is not separated from the reclaimed rubber but is utilized as a mixture of the two products.

What I claim as new and wish to protect by Letters Patent is:

1. The process of plasticizing rubber-like materials which comprises preparing a plasticizer by the process consisting essentially in extracting a petroleum feed oil derived from an aromatic type crude, having an initial boiling point of about 700° F., a gravity of about 19° A. P. I., a viscosity of about 90 seconds Saybolt at 210° F., and a viscosity index of about 9, with 200% by volume of a solvent comprising 80% phenol and 20% water, at a temperature of about 110°–160° F. in the extract end of the extracting system, under conditions to extract a relatively small amount of an extract oil having an aromatic content of about 76%, separating the solvent extract phase and removing the solvent therefrom, and distilling said highly aromatic extract at an absolute pressure below about 100 mm. mercury in the presence of an excess of caustic soda over that required to neutralize acidic components in said aromatic fraction, to obtain a distillate fraction having a boiling point above 700° F., a viscosity above 2,000 seconds Saybolt at 210° F., a gravity below 5° A. P. I. and an aromatic content of at least 75%, and then incorporating about 15% of the resulting plasticizing agent into a rubbery material selected from the group consisting of natural and synthetic rubbers.

2. The process of plasticizing rubber-like materials which comprises preparing a plasticizer by the process consisting essentially in treating a petroleum feed oil having an initial boiling point of at least 700° F., a gravity of 10° to 20° A. P. I., and a viscosity index below about 20, with a solvent having a preferential selectivity for the relatively more aromatic type constituents as compared to the relatively more paraffinic type constituents and suitable for solvent extraction of such high boiling petroleum oils, said treatment being carried out with a relatively low ratio of solvent to oil between the limits of 0.25 and 0.75, under conditions to segregate in the solvent phase a relatively small amount, not more than about 10% based on the feed oil, of a highly aromatic material having an aromatic content of at least 50%, separating the solvent therefrom and distilling said highly aromatic material at an absolute pressure less than 100 mm. mercury, in the presence of an excess of an alkaline reagent of that required to neutralize acidic components in said aromatic fraction, to obtain the desired distillate fraction having a boiling point above 700° F. at atmospheric pressure, a viscosity above about 600 seconds Saybolt at 210° F., a specific gravity about 1.0 and an aromatic content of at least 75%, and then incorporating 5% to 35% of the resulting plasticizing agent into a rubbery material selected from the group consisting of natural and synthetic rubbers.

3. The process of plasticizing rubber-like materials which comprises preparing a plasticizer by the process consisting essentially in treating a petroleum feed oil having an initial boiling point of at least 700° F., a gravity of 10° to 20° A. P. I., and a viscosity index below about 20, with not more than 200% by volume of a solvent consisting of phenol containing 10% to 20% of water, under conditions to segregate in the solvent phase a relatively small amount, not more than about 10% based on the feed oil, of a highly aromatic material having an aromatic content of at least 50%, separating the solvent therefrom and distilling said highly aromatic material at an absolute pressure less than 100 mm. mercury, in the presence of an excess of an alkaline reagent of that required to neutralize acidic components in said aromatic fraction, to obtain the desired distillate fraction having a boiling point above 700° F. at atmospheric pressure, a viscosity above about 600 seconds Saybolt at 210° F., a specific gravity above 1.0 and an aromatic content of at least 75%, and then incorporating 5% to 35% of the resulting plasticizing agent into a rubbery material selected from the group consisting of natural and synthetic rubbers.

CHESTER L. READ.